(12) United States Patent
Su

(10) Patent No.: US 9,377,591 B1
(45) Date of Patent: Jun. 28, 2016

(54) FIBER-OPTIC COMMUNICATION MODULE WITH DE-LATCHING MECHANISM

(71) Applicant: DELTA ELECTRONICS, INC., Taoyuan Hsien (TW)

(72) Inventor: Li-Hua Su, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 0 days.

(21) Appl. No.: 14/805,158

(22) Filed: Jul. 21, 2015

(30) Foreign Application Priority Data

Feb. 6, 2015 (TW) .............................. 104103994 A

(51) Int. Cl.
  *G02B 6/36* (2006.01)
  *G02B 6/38* (2006.01)

(52) U.S. Cl.
  CPC ............ *G02B 6/3879* (2013.01); *G02B 6/3885* (2013.01); *G02B 6/3893* (2013.01)

(58) Field of Classification Search
  CPC ... G02B 6/3879; G02B 6/3885; G02B 6/3893
  USPC ................ 385/53, 76; 398/135, 138
  See application file for complete search history.

(56) References Cited

U.S. PATENT DOCUMENTS

| | | | | |
|---|---|---|---|---|
| 6,851,867 B2 * | 2/2005 | Pang | ................... | G02B 6/3825 385/134 |
| 6,872,010 B1 * | 3/2005 | Bianchini | ............ | G02B 6/4246 385/53 |
| 7,513,693 B2 * | 4/2009 | Wang | ................... | G02B 6/3897 385/56 |
| 7,618,199 B1 * | 11/2009 | Cheng | ................. | G02B 6/4246 385/53 |
| 8,206,043 B2 * | 6/2012 | Thirugnanam | ...... | G02B 6/4246 385/53 |
| 8,226,305 B2 * | 7/2012 | Thirugnanam | ...... | G02B 6/4246 385/53 |
| 2012/0106903 A1 * | 5/2012 | Thirugnanam | ...... | G02B 6/4246 385/92 |

* cited by examiner

*Primary Examiner* — Ryan Lepisto
*Assistant Examiner* — Guy Anderson
(74) *Attorney, Agent, or Firm* — Kirton McConkie; Evan R. Witt

(57) ABSTRACT

A fiber-optic communication module with a de-latching mechanism is provided. The fiber-optic communication module includes a main body, a handle and a sliding member. Two tracks are located at two opposite sides of the main body. The handle is pivotally coupled to the main body, and rotatable relative to the main body to be in a latched position or a de-latched position. Two first guiding parts are located at two opposite sides of the handle. The sliding member includes two extension arms and two second guiding parts. The two second guiding parts are located at the corresponding extension arms. While the handle is rotated to the de-latched position, the two second guiding parts are moved relative to the corresponding first guiding parts. Consequently, the extension arms are slid linearly in a direction away from the receptacle.

9 Claims, 8 Drawing Sheets

FIBER-OPTIC COMMUNICATION MODULE WITH DE-LATCHING MECHANISM

FIELD OF THE INVENTION

The present invention relates to a fiber-optic communication module, and more particularly to a fiber-optic communication module with a de-latching mechanism.

BACKGROUND OF THE INVENTION

Recently, with increasing development of computer systems and associated peripheral devices, the data transmission speed is gradually increased in order to implement more complicated tasks such as digital signal transmission and image analysis. For meeting these requirements, fiber optic communication technologies are developed to achieve long-distance or short-distance signal transmission. That is, the uses of high-speed optical signals can replace the electrical signals to transmit information at a higher speed.

A fiber-optic communication module is used for transmitting signals between electronic devices. For increasing the design flexibility and the maintenance ease of the system, the fiber-optic communication module is swappable to be inserted into a corresponding receptacle of a communication device. Moreover, the fiber-optic communication module is usually equipped with a de-latching mechanism for locking the fiber-optic communication module in the receptacle or for ejecting the fiber-optic communication module from the receptacle.

FIG. 1 is a schematic exploded view illustrating a conventional fiber-optic communication module with a de-latching mechanism. As shown in FIG. 1, the fiber-optic communication module 1 comprises a main body 10, a sliding member 11 and a handle 12. The sliding member 11 comprises two sliding arms 111. The sliding arms 111 are slidably disposed in corresponding tracks 101 of the main body 10. The handle 12 is combined with the main body 10 and the sliding member 11. When the handle 12 is pulled in response to an external force, the sliding arms 111 of the sliding member 11 are slid within the corresponding tracks 101. Moreover, each sliding arm 111 has a protrusion 112 at one end of the sliding arm 111. The receptacle (not shown) of the communication device has an inwardly-bent resilient slice (not shown). When the fiber-optic communication module 1 is inserted into the receptacle, the resilient slice of the receptacle is engaged with the protrusion 112 at the end of the sliding arm 111 of the sliding member 11, so that the fiber-optic communication module 1 is latched in the receptacle. On the other hand, when the handle 12 is rotated and the sliding arm 111 of the sliding member 11 is slid within the corresponding track 101, the resilient slice of the receptacle is pushed by the protrusion 112 of the sliding arm 111. Consequently, the fiber-optic communication module 1 is in a de-latched status, and the fiber-optic communication module 1 can be detached from the receptacle.

A process of assembling the fiber-optic communication module 1 will be illustrated as follows. Firstly, the sliding member 11 is aligned with the handle 12, and then the sliding member 11 and the handle 12 are aligned with the main body 10. In particular, the sliding arms 111 of the sliding member 11 are disposed within the corresponding tracks 101 of the main body 10; and a perforation 113 of the sliding member 11, a first guiding slot 121 of the handle 12 and a second guiding slot 104 of the main body 10 are aligned with each other. Then, a first screwing element 13 is penetrated through the perforation 113, the first guiding slot 121 and the second guiding slot 104, so that the sliding member 11 and the handle 12 are combined with the main body 10. Then, the handle 12 is pivotally coupled to the main body 10 through a second screwing element 14. Consequently, the handle 12 is rotatable relative to the main body 10 and the sliding arm 111 of the sliding member 11 is slidably disposed within the corresponding track 101. After a case 102 and a bottom plate 103 of the main body 10 are combined together through plural third screwing elements 15, the fiber-optic communication module 1 is assembled.

From the above discussions, the process of assembling the conventional fiber-optic communication module 1 has some drawbacks. For example, the associated components should be firstly aligned with each other, and then the main body 10, the sliding member 11 and the handle 12 are combined together through plural screwing elements (i.e., the first screwing elements 13, the second screwing elements 14 and the third screwing elements 15). Consequently, the assembling process is complicated and time-consuming, and the cost of fabricating and managing the components is increased.

Moreover, while the fiber-optic communication module 1 is de-latched from the receptacle, if the pulling force is too large, the sliding arm 111 of the sliding member 11 is readily shifted. Under this circumstance, the sliding arm 111 is suffered from deformation or escaped from the track 101. In other words, the de-latching mechanism of the conventional fiber-optic communication module 1 is not user-friendly.

Therefore, there is a need of providing a fiber-optic communication module with an improved de-latching mechanism in order to eliminate the above drawbacks.

SUMMARY OF THE INVENTION

An object of the present invention provides a fiber-optic communication module with a de-latching mechanism. A main body of the fiber-optic communication module has two first protruding edges and two second protruding edges to define two tracks. Due to the first protruding edges and the second protruding edges, the positions of two extension arms of a sliding member is effectively limited within the corresponding tracks. Consequently, even if the pulling force is too large, the possibility of escaping the extension arms from the tracks and the possibility of causing deformation of the extension arms will be minimized.

Another object of the present invention provides a fiber-optic communication module with a de-latching mechanism. The de-latching mechanism comprises two first pivotal elements, two second pivotal elements, two first guiding parts and two second guiding parts. Due to the connection between the first pivotal elements and the second pivotal elements and the connection between the second first guiding parts and the second guiding parts, it is not necessary to use screwing elements to assemble the de-latching mechanism. Consequently, the assembling process is simplified and the assembling cost is reduced.

A further object of the present invention provides a fiber-optic communication module with a de-latching mechanism. When a handle is rotated to a de-latched position, the sliding member is slid linearly in the direction away from the receptacle, so that the fiber-optic communication module is de-latched from the receptacle.

In accordance with an aspect of the present invention, there is provided a fiber-optic communication module with a de-latching mechanism. The fiber-optic communication module is swappable to be inserted into a corresponding receptacle of a communication device. The fiber-optic communication module includes a main body, a handle and a sliding member. The main body includes two tracks. The two tracks are located at two opposite sides of the main body. The handle is pivotally coupled to the main body, and rotatable relative to the main body to be in a latched position or a de-latched position, wherein two first guiding parts are located at two opposite sides of the handle. The sliding member includes two extension arms and two second guiding parts. The two second guiding parts are located at the corresponding extension arms. The two second guiding parts are connected with the corresponding first guiding parts of the handle. While the handle is rotated from the latched position to the de-latched position, the two second guiding parts are moved relative to the corresponding first guiding parts of the handle, so that the extension arms are slid linearly in a direction away from the receptacle and the fiber-optic communication module is de-latched from the receptacle.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
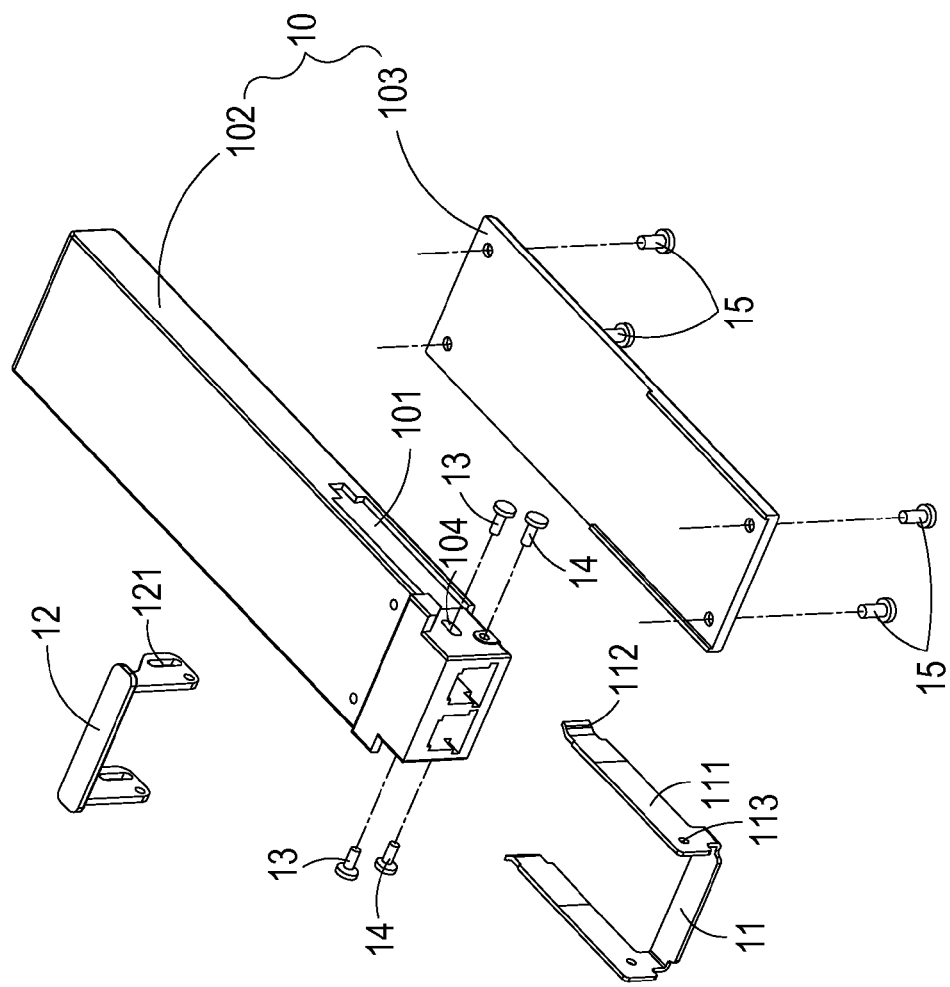
FIG. 1 is a schematic exploded view illustrating a conventional fiber-optic communication module with a de-latching mechanism.
Figure 2:
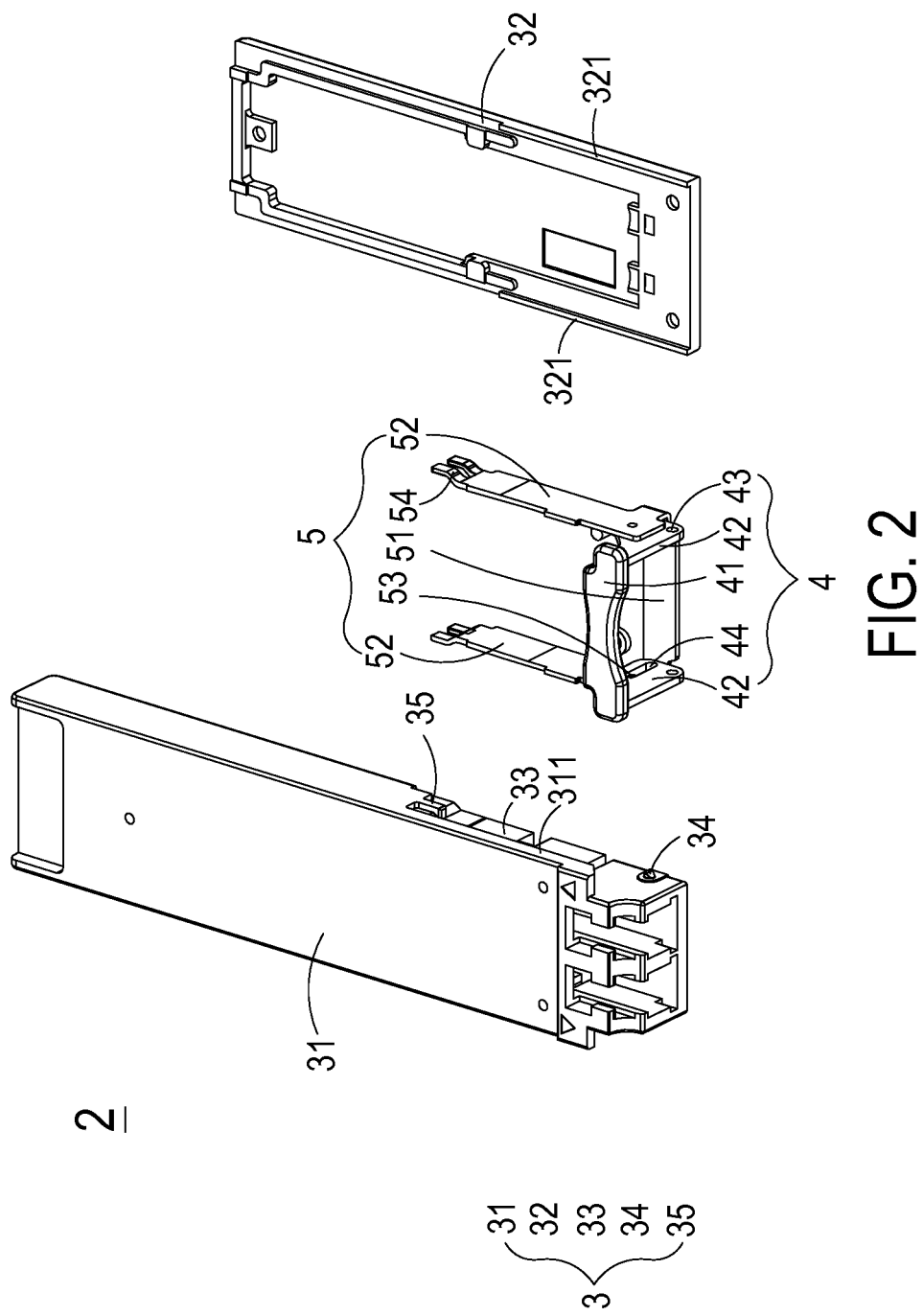
FIG. 2 is a schematic exploded view illustrating a fiber-optic communication module with a de-latching mechanism according to an embodiment of the present invention.

FIG. 2 is a schematic exploded view illustrating a fiber-optic communication module with a de-latching mechanism according to an embodiment of the present invention. The fiber-optic communication module 2 may be inserted into a corresponding receptacle 6 of a communication device (see FIG. 6). The fiber-optic communication module 2 comprises a main body 3, a handle 4 and a sliding member 5. Two tracks 33 are located at two opposite sides of the main body 3, respectively. The handle 4 is pivotally couple to the main body 3. Moreover, the handle 4 is rotatable relative to the main body 3 so as to be in a latched position (see FIG. 7A) or a de-latched position (see FIG. 7B). Two first guiding parts 44 are located at two opposite sides of the handle 4, respectively. The sliding member 5 comprises two extension arms 52 and two second guiding parts 53. The two extension arms 52 are slidably disposed within the corresponding tracks 33 of the main body 3. The two second guiding parts 53 are located at the corresponding extension arms 52. Moreover, the two second guiding parts 53 are connected with the two first guiding parts 44 of the handle 4, respectively. While the handle 4 is switched from the latched position to the de-latched position, the second guiding parts 53 of the sliding member 5 can be moved relative to the corresponding first guiding parts 44 of the handle 4. Consequently, the extension arms 52 are slid linearly in the direction away from the receptacle 6, and the fiber-optic communication module 2 is de-latched from the receptacle 6.

Please refer to FIG. 2 again. The main body 3 is used for accommodating some components with the light emitting/receiving functions. Examples of these components include but are not limited to a light emitting device, a light detecting device and a driver/receiver circuitry module. In this embodiment, the main body 3 comprises a first case 31 and a second case 32. The first case 31 and the second case 32 may be combined together by a locking means, a screwing means or any other appropriate connecting means. Moreover, the first case 31 comprises two first protruding edges 311, which are protruded downwardly from two lateral sides of the first case 31, respectively. The second case 32 comprises two second protruding edges 321, which are protruded upwardly from two lateral sides of second case 32, respectively. When the first case 31 and the second case 32 are combined together, the two tracks 33 at the two opposite sides of the main body 3 are defined by the two first protruding edges 311 and the two second protruding edges 321 collaboratively. The two extension arms 52 of the sliding member 5 are slidably disposed within the corresponding tracks 33 of the main body 3. Preferably but not exclusively, the first protruding edges 311 are integrally formed with the first case 31, and the second protruding edges 321 are integrally formed with the second case 32.

In this embodiment, the first case 31 of the main body 3 further comprises two first pivotal structures 34 and two coupling structures 35. The first pivotal structures 34 are located at two opposite sides of the first case 31, respectively. Moreover, the first pivotal structures 34 are pivotally coupled to the corresponding second pivotal structures 43 of the handle 4. The coupling structures 35 are located beside the two tracks 33, respectively. The coupling structures 35 are respectively engaged with corresponding elastic structures 54, which are located at the rear ends of the corresponding extension arms 52. It is noted that the positions and the structures of the coupling structures 35 and the elastic structures 54 are not restricted.

Figure 3:
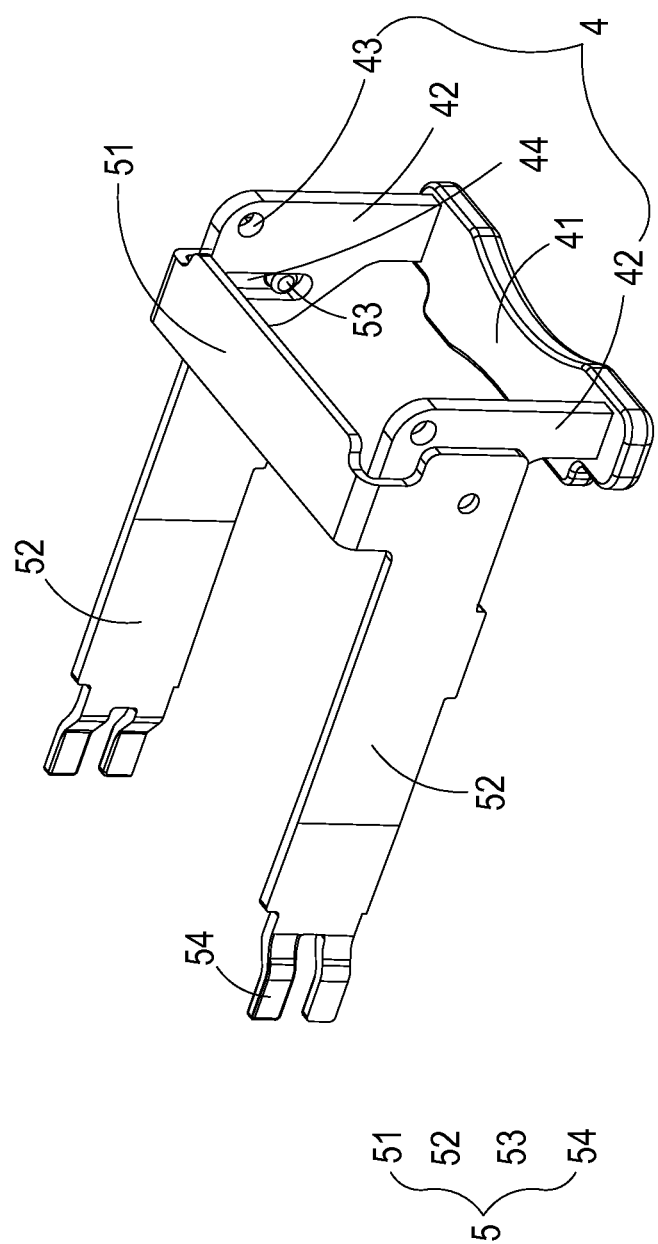
FIG. 3 is a schematic perspective view illustrating the relationship between the handle and the sliding member of the fiber-optic communication module of FIG. 2.

FIG. 3 is a schematic perspective view illustrating the relationship between the handle and the sliding member of the fiber-optic communication module of FIG. 2. As shown in FIG. 3, the handle 4 comprises a grasping part 41 and two lateral plates 42. The two lateral plates 42 are located at two ends of the grasping part 41, respectively. In other words, the handle 4 is substantially U-shaped. In this embodiment, the handle 4 further comprises the two second pivotal structures 43 and the two first guiding parts 44. Through the two second pivotal structures 43 and the two first guiding parts 44, the handle 4 is combined with the main body 3 and the sliding member 5, respectively. The positions and profiles of the second pivotal structures 43 correspond to those of the first pivotal structures 34 of the main body 3 (see FIG. 4). In this embodiment, the two second pivotal structures 43 are respectively located at the two lateral plates 42 and pivotally coupled to the corresponding first pivotal structures 34 of the main body 3. In this embodiment, the first pivotal structure 34 is a salient, and the second pivotal structure 43 is an opening. Moreover, the second pivotal structure 43 is sheathed around the first pivotal structure 34. Consequently, the second pivotal structure 43 of the handle 4 is rotatable relative to the main body 3 by using the first pivotal structure 34 as a fulcrum. It is noted that the examples of the first pivotal structure 34 and the second pivotal structure 43 are not restricted. For example, in another embodiment, the first pivotal structure 34 is an indentation, and the second pivotal structure 43 is a shaft. That is, any pivotal structures that are pivotally coupled with each other to allow the handle 4 to be rotated relative to the main body 3 can be used as the first pivotal structure 34 and the second pivotal structure 43. Moreover, the two first guiding parts 44 of the handle 4 are also located at the two lateral plates 42, respectively. The first guiding parts 44 are connected with the corresponding second guiding parts 53 of the sliding member 5. Consequently, the sliding member 5 may be moved with the handle 4.

Please refer to FIG. 3 again. The sliding member 5 comprises a connecting part 51 and the two extension arms 52. The extension arms 52 are connected with each other through the connecting part 51. In this embodiment, the two extension arms 52 are in parallel with each other and respectively connected with two ends of the connecting part 51. Preferably but not exclusively, the extension arms 52 are integrally formed with the connecting part 51.

As mentioned above, the sliding member 5 comprises the second guiding parts 53 and the two elastic structures 54. The second guiding parts 53 are connected with the corresponding first guiding parts 44 of the handle 4, so that the sliding member 5 may be moved with the handle 4. In this embodiment, the two second guiding parts 53 are located at the corresponding extension arms 52 and aligned with the corresponding first guiding parts 44 of the handle 4. In this embodiment, the first guiding parts 44 of the handle 4 are guiding slots, and the second guiding parts 53 of the sliding member 5 are guiding posts accommodated within the guiding slots. Since the second guiding parts 53 of the sliding member 5 are guided by the first guiding parts 44 of the handle 4, the second guiding parts 53 of the sliding member 5 are stably moved along the corresponding first guiding parts 44 of the handle 4. It is noted that the examples of the first guiding parts 44 and the second guiding parts 53 are not restricted. For example, in another embodiment, the first guiding parts 44 of the handle 4 are guiding posts, and the second guiding parts 53 of the sliding member 5 are guiding slots. After the first guiding parts 44 of the handle 4 and the corresponding second guiding parts 53 of the sliding member 5 are connected with each other, the second guiding parts 53 of the sliding member 5 are guided by the first guiding parts 44 of the handle 4. Consequently, the extension arms 52 are moved with the handle 4.

Each elastic structure 54 is externally protruded from an end of the extension arm 52. The elastic structure 54 may be engaged with the corresponding coupling structure 35 of the main body 3. In this embodiment, the elastic structure 54 includes two resilient slices, which are arranged side-by-side. As shown in FIG. 2, the coupling structure 35 is located at the first case 32 and includes two recesses corresponding to the two resilient slices of the elastic structure 54. It is noted that the numbers and profiles of the elastic structures 54 and the coupling structures 35 are not restricted as long as the elastic structures 54 and the corresponding coupling structures 35 are engageable with each other. For example, in another embodiment, the elastic structure 54 includes a single externally-protruded residence slice, and the coupling structure 35 includes one recess.

Figure 4:
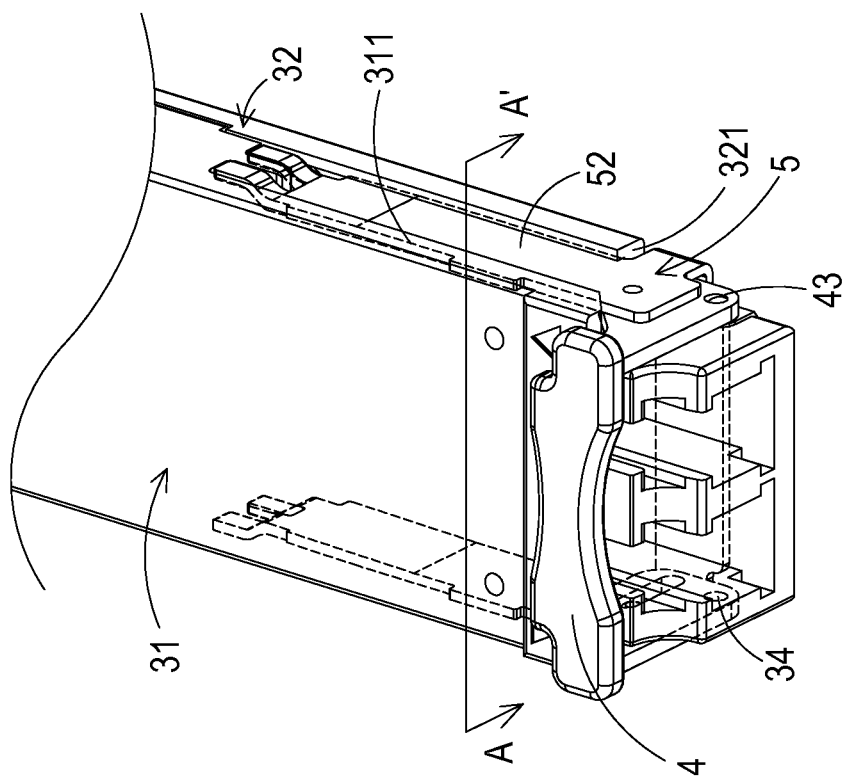
FIG. 4 is a schematic assembled view illustrating the fiber-optic communication module according to the embodiment of the present invention.

FIG. 4 is a schematic assembled view illustrating the fiber-optic communication module according to the embodiment of the present invention. Hereinafter, a process of assembling the fiber-optic communication module 2 will be illustrated with reference to FIGS. 2, 3 and 4. Firstly, the first guiding parts 44 (e.g., the guiding slots) of the handle 4 and the second guiding parts 53 (e.g., the guiding posts) of the sliding member 5 are connected with each other by a simple locking means. Consequently, the handle 4 and the sliding member 5 are combined together. Then, the second pivotal structure 43 (e.g., the openings) of the handle 4 are sheathed around the first pivotal structures 34 (e.g., the salients) of the main body 3, and the two extension arms 52 of the sliding member 5 are disposed within the corresponding tracks 33 of the first case 31 of the main body 3. Consequently, the handle 4, the sliding member 5 and the first case 3 are combined together. After the second case 32 and the first case 31 are combined together, the fiber-optic communication module 2 is assembled. Due to the connection between the pivotal elements 34 and 43 and the connection between the guiding parts 44 and 53, the handle 4 can securely combined with the sliding member 5 and the main body 3. Moreover, by rotating the handle 4 to the de-latched position, the sliding member 5 can be linearly slid within the tracks 33 of the main body 3. Since it is not necessary to sequentially use screwing elements to assemble the fiber-optic communication module 2, the assembling process is simplified and the assembling cost is reduced.

Figure 5:
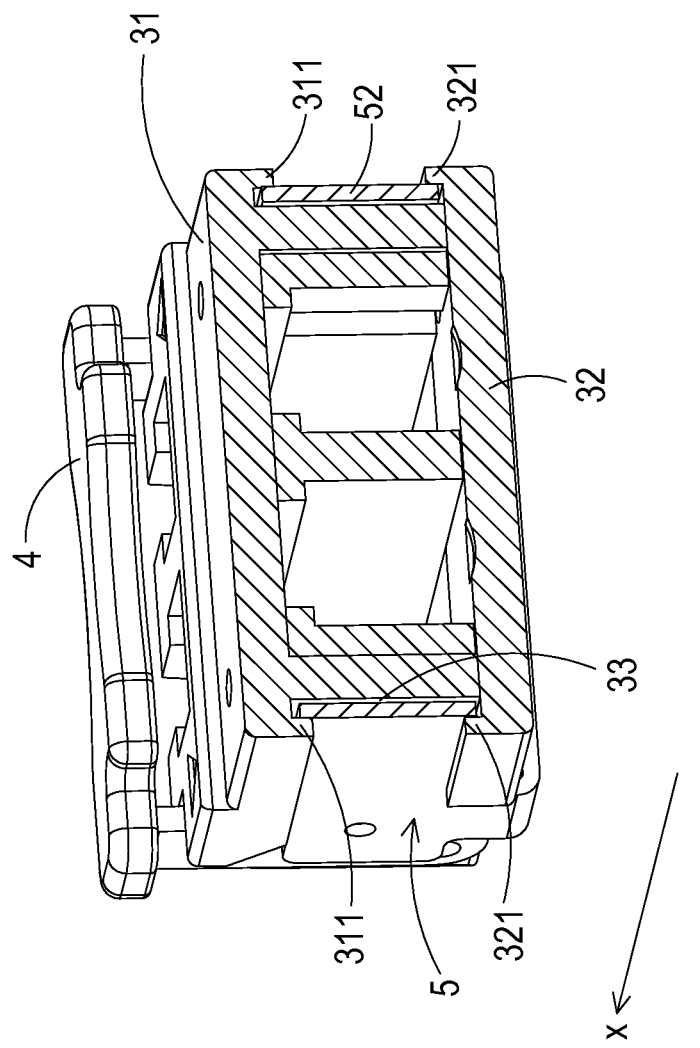
FIG. 5 is a schematic cross-sectional view illustrating the fiber-optic communication module of FIG. 4 and taken along the line AA'.

FIG. 5 is a schematic cross-sectional view illustrating the fiber-optic communication module of FIG. 4 and taken along the line AA'. After the fiber-optic communication module 2 is assembled, the two extension arms 52 of the sliding member 5 are disposed within the corresponding tracks 33 of the main body 3. As shown in the cross-sectional view of FIG. 5, the two first protruding edges 311 are protruded downwardly from the two lateral sides of the first case 31, and the two second protruding edges 321 are protruded upwardly from the two lateral sides of second case 32. Consequently, when the two extension arms 52 of the sliding member 5 are disposed within the corresponding tracks 33 of the main body 3, the positions of the extension arms 52 are limited by the first protruding edges 311 and the second protruding edges 321. Due to the first protruding edges 311 and the second protruding edges 321, the extension arms 52 are neither shifted upwardly or downwardly nor escaped from the lateral sides of the main body 3. Consequently, the extension arms 52 can be smoothly slid within the corresponding tracks 33. Even if the pulling force is large, the possibility of escaping the extension arms 52 from the tracks 33 and the possibility of causing deformation of the extension arms 52 will be minimized.

Figure 6:
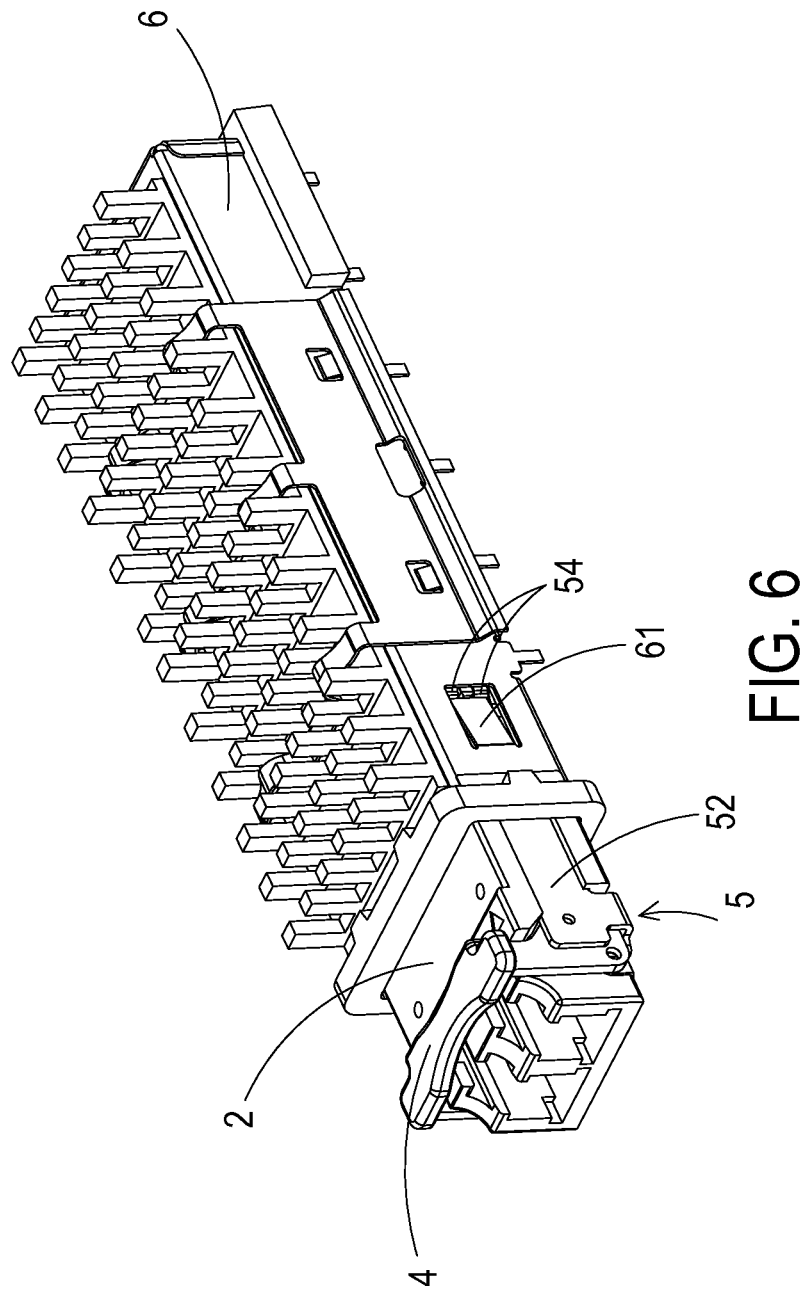
FIG. 6 is a schematic perspective view illustrating the fiber-optic communication module latched in a receptacle.

FIG. 6 is a schematic perspective view illustrating the fiber-optic communication module latched in a receptacle. The fiber-optic communication module 2 is swappable to be inserted into a corresponding receptacle 6 of a communication device. The receptacle 6 comprises two latching plates 61. The two latching plates 61 are located at two opposite sidewalls of the receptacle 6, respectively. Moreover, the positions of the two latching plates 61 correspond to the two extension arms 52 of the fiber-optic communication module 2, respectively. The two latching plates 61 are bent inwardly toward the receptacle 6. When the fiber-optic communication module 2 is accommodated within the receptacle 6, the fiber-optic communication module 2 is latched by the latching plates 61. Preferably but not exclusively, the latching plates 61 are resilient plates.

Figure 7A:
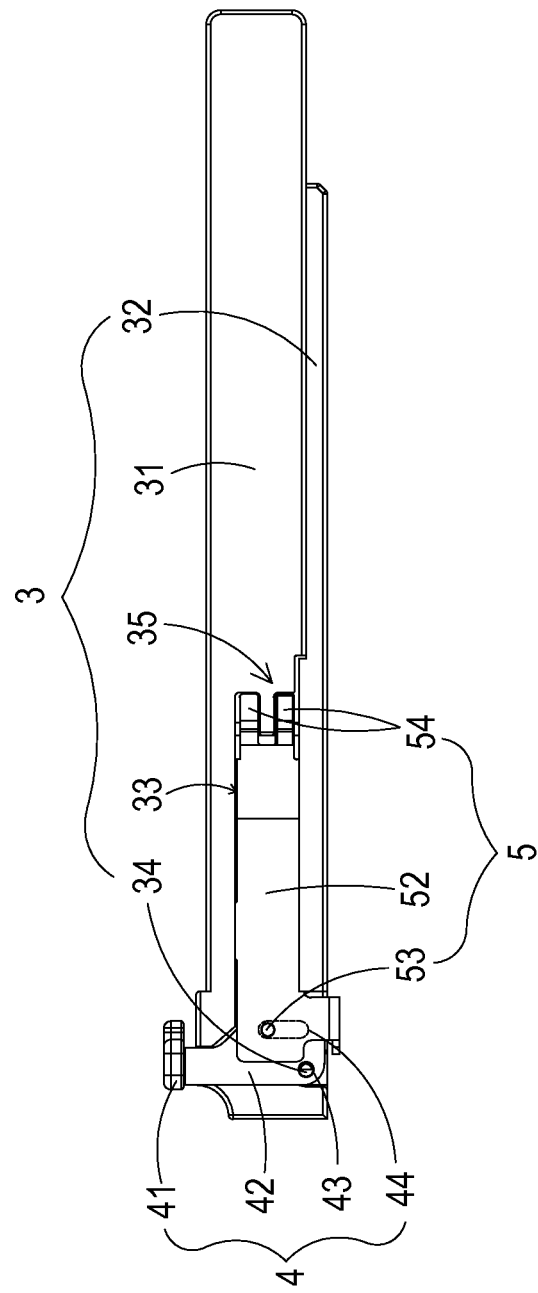
FIG. 7A is a schematic side view illustrating the fiber-optic communication module, wherein the handle is in the latched position.

FIG. 7A is a schematic side view illustrating the fiber-optic communication module, wherein the handle is in the latched position. Please refer to FIGS. 6 and 7A. After the fiber-optic communication module 2 is accommodated within the receptacle 6, if the handle 4 is rotated to the latched position, the extension arms 52 are disposed within the corresponding tracks 33 and the elastic structures 54 at the rear ends of the extension arms 52 are engaged with the corresponding coupling structures 35 of the main body 3. Under this circumstance, the elastic structures 54 of the sliding member 5 are locked by the corresponding inwardly-bent latching plates 61 of the receptacle 6. Consequently, the fiber-optic communication module 2 can be securely latched in the receptacle 6.

Figure 7B:
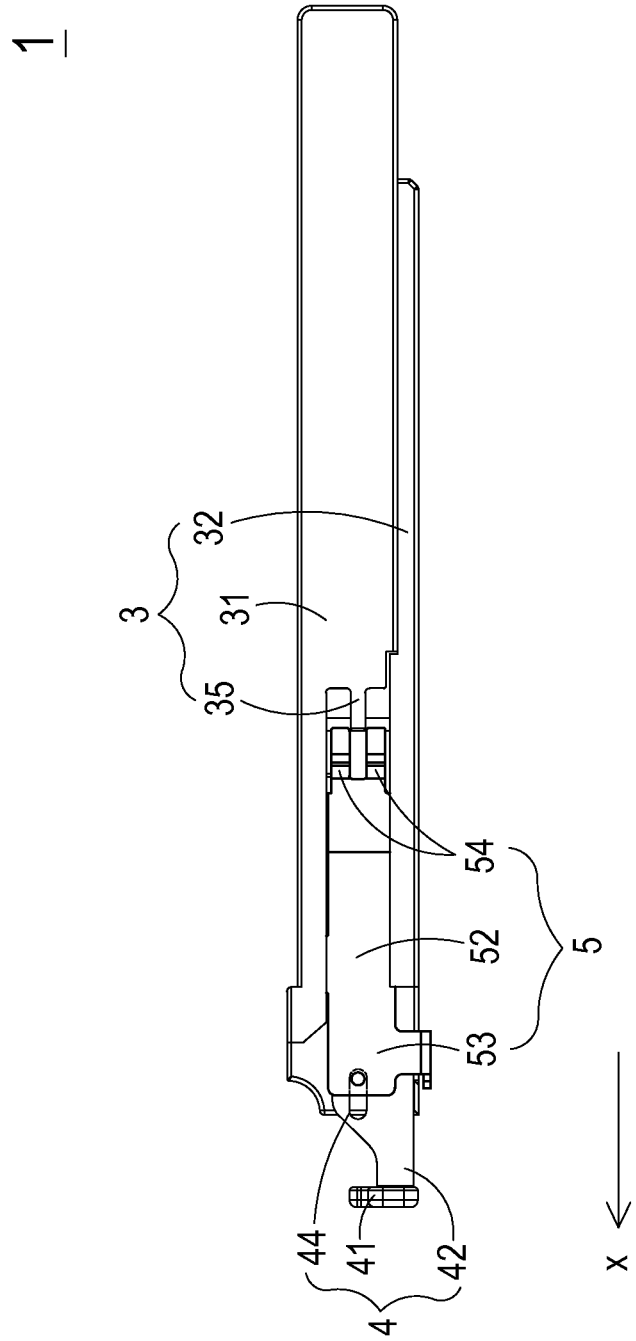
FIG. 7B is a schematic side view illustrating the fiber-optic communication module, wherein the handle is in the de-latched position.

FIG. 7B is a schematic side view illustrating the fiber-optic communication module, wherein the handle is in the de-latched position. After the handle 4 is switched from the latched position (see FIG. 7A) to the de-latched position (see FIG. 7B), the extension arms 52 of the sliding member 5 can be moved along the tracks 33 linearly in the direction X away from the receptacle 6. Consequently, the fiber-optic communication module 2 is de-latched from the receptacle 6. In particular, while the second pivotal structures 43 of the handle 4 are rotated relative to the main body 3 by using the first pivotal structures 34 as the fulcrums, the second guiding parts 53 (e.g., the guiding posts) of the sliding member 5 are moved relative to the first guiding parts 44 (e.g., the guiding slots) of the handle 4. Consequently, the extension arms 52 of the sliding member 5 are slid linearly along the tracks 33 in the direction away from the receptacle 6. Meanwhile, the elastic structures 54 at the rear ends of the extension arms 52 are disengaged from the coupling structures 35 of the main body 3 and slid to the tracks 33. At the same time, the elastic structures 54 press against and prop open the inwardly-bent latching plates 61. Consequently, the fiber-optic communication module 2 is de-latched from the receptacle 6. Moreover, since the positions of the extension arms 52 are limited by the first protruding edges 311 of the first case 31 and the second protruding edges 321 of the second case 32, the extension arms 52 can be smoothly slid within the corresponding tracks 33 when the fiber-optic communication module 2 is in the de-latched status. Consequently, even if the pulling force is large, the possibility of escaping the extension arms 52 from the tracks 33 and the possibility of causing deformation of the extension arms 52 will be minimized.

From the above descriptions, the present invention provides the fiber-optic communication module with the de-latching mechanism. Due to the connection between the first pivotal elements and the second pivotal elements and the connection between the second first guiding parts and the second guiding parts, it is not necessary to use screwing elements to assemble the fiber-optic communication module. When a handle is rotated to a de-latched position, the sliding member is slid linearly in the direction away from the receptacle, so that the fiber-optic communication module is de-latched from the receptacle. Consequently, the assembling process is simplified and the assembling cost is reduced. Moreover, due to the first protruding edges and the second protruding edges, the positions of two extension arms of a sliding member is effectively limited within the corresponding tracks of the main body. Even if the pulling force is large, the possibility of escaping the extension arms from the tracks and the possibility of causing deformation of the extension arms will be minimized.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A fiber-optic communication module with a de-latching mechanism, the fiber-optic communication module is inserted into a corresponding receptacle of a communication device, the fiber-optic communication module comprising:
a main body comprising a first case and a second case, wherein the first case and the second case are combined together, the first case comprises two first protruding edges, the two first protruding edges are protruded from two lateral sides of the first case, respectively, the second case comprises two second protruding edges, and the two second protruding edges are protruded from two lateral sides of the second case, respectively, each of the first protruding edges is extended toward the second protruding edges on the same lateral side, and two tracks at two opposite sides of the main body are defined by the two first protruding edges and the two second protruding edges collaboratively;
a handle pivotally coupled to the main body, and rotatable relative to the main body to be in a latched position or a de-latched position, wherein the handle has two first guiding parts located at two opposite sides thereof; and
a sliding member comprising two extension arms and two second guiding parts, wherein the two second guiding parts are located at the corresponding extension arms, and the two second guiding parts are connected with the corresponding first guiding parts of the handle,
wherein the two extension arms are disposed within the corresponding tracks of the main body, and an inner surface of each first protruding edge and an inner surface of each second protruding edge both face an outer surface of each corresponding extension arm, and positions of the two extension arms are limited by the two first protruding edges and the two second protruding edges, while the handle is rotated from the latched position to the de-latched position, the two second guiding parts of the sliding member are moved relative to the corresponding first guiding parts of the handle, so that the extension arms are slid linearly in a direction away from the receptacle and the fiber-optic communication module is de-latched from the receptacle.

2. The fiber-optic communication module according to claim 1, wherein the first guiding parts are guiding slots, and the second guiding parts are guiding posts.

3. The fiber-optic communication module according to claim 1, wherein the main body further comprises two first pivotal structures, and the handle further comprises two second pivotal structures, wherein the two first pivotal structures match the two second pivotal structures, respectively, wherein the second pivotal structures are rotatable relative to the main body by using the first pivotal structures as fulcrums.

4. The fiber-optic communication module according to claim 3, wherein the first pivotal structures are salients, and the second pivotal structures are openings.

5. The fiber-optic communication module according to claim 3, wherein the handle further comprises a grasping part and two lateral plates, wherein the two lateral plates are located at two ends of the grasping part, respectively, wherein the two second pivotal structures and the two first guiding parts are located at the two lateral plates, respectively.

6. The fiber-optic communication module according to claim 1, wherein the sliding member further comprises a connecting part, wherein the two extension arms are connected with each other through the connecting part, wherein the two extension arms are in parallel with each other and connected with two ends of the connecting part, respectively.

7. The fiber-optic communication module according to claim 1, wherein the main body further comprises two coupling structures, and the two coupling structures are located beside the two tracks, respectively, wherein the sliding member further comprises two elastic structures, and the two elastic structures are externally protruded from rear ends of the two extension arms, respectively, wherein when the handle is rotated to the latched position, the elastic structures are engaged with the corresponding coupling structures.

8. The fiber-optic communication module according to claim 7, wherein the receptacle further comprises two inwardly-bent latching plates, wherein when the handle is in the latched position, the two latching plates are in contact with the corresponding elastic structures.

9. The fiber-optic communication module according to claim 7, wherein while the handle is rotated from the latched position to the de-latched position, the elastic structures of the sliding member press against the latching plates to prop open the latching plates, so that the fiber-optic communication module is de-latched from the receptacle.

* * * * *